Jan. 1, 1929. 1,697,455

F. A. BURNINGHAM ET AL
RECORDER

Filed June 13, 1925 3 Sheets-Sheet 1

Fig. 1.

Inventors
Foster A. Burningham
Hugh K. Moore
by their attorneys

Jan. 1, 1929.
F. A. BURNINGHAM ET AL
RECORDER
Filed June 13, 1925   3 Sheets-Sheet 2
1,697,455
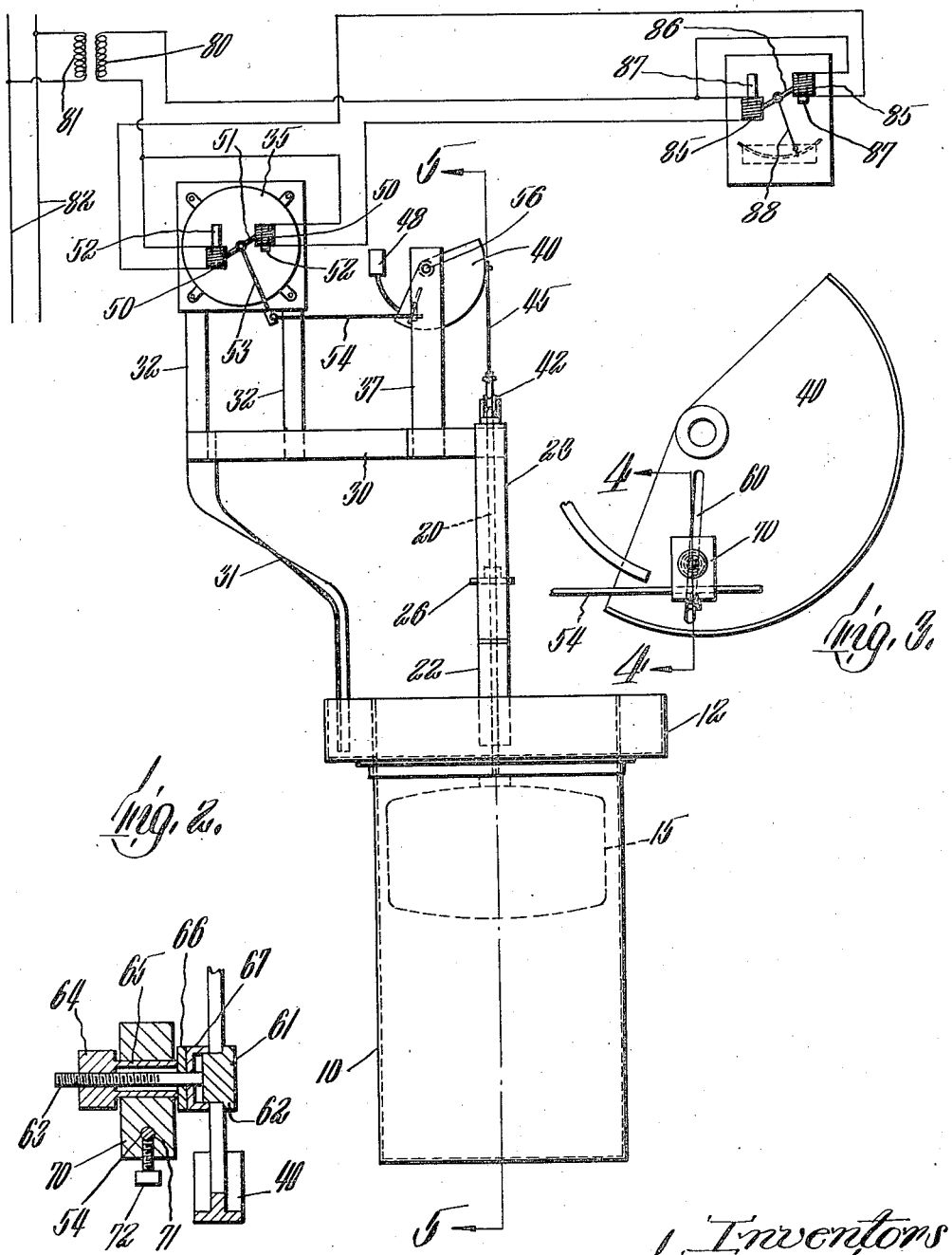
Inventors
Foster A. Burningham
Hugh K. Moore Jan. 1, 1929.                F. A. BURNINGHAM ET AL                1,697,455
                                    RECORDER
                        Filed June 13, 1925      3 Sheets-Sheet 3
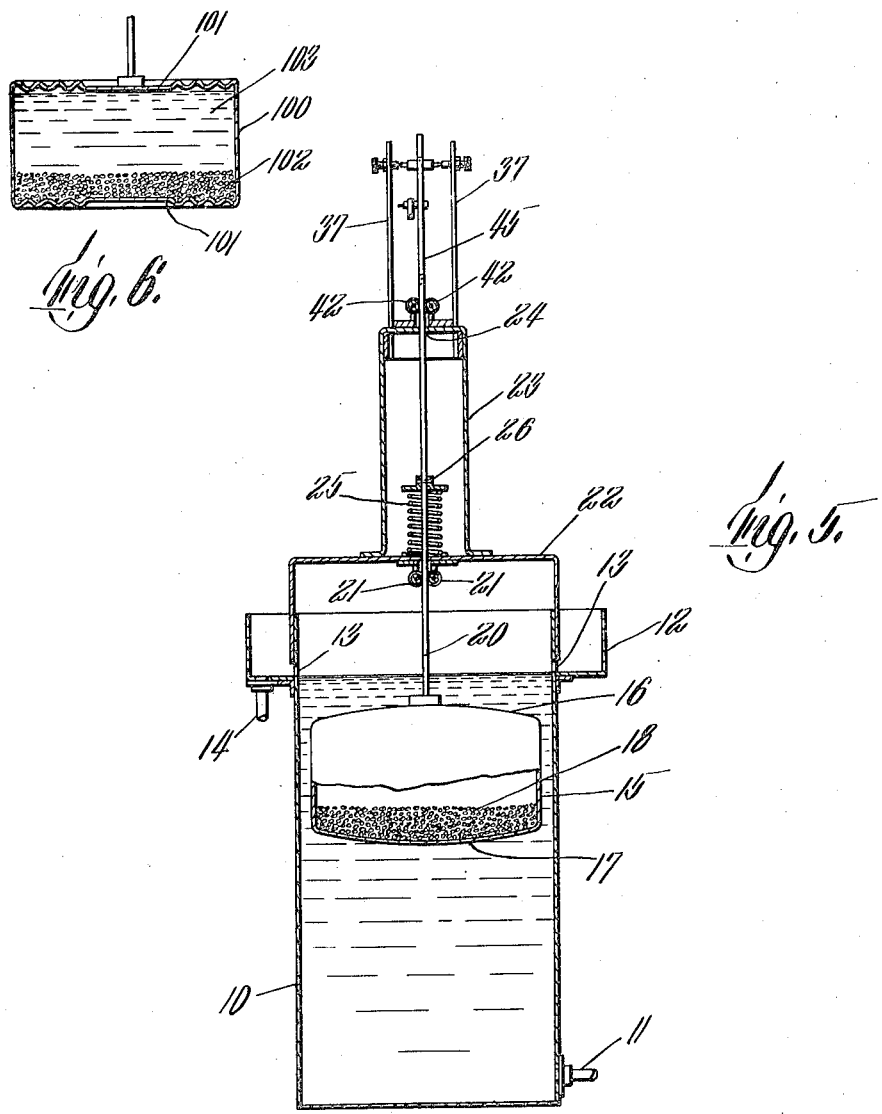

Patented Jan. 1, 1929.

1,697,455

UNITED STATES PATENT OFFICE.

FOSTER A. BURNINGHAM AND HUGH K. MOORE, OF BERLIN, NEW HAMPSHIRE, ASSIGNORS TO BROWN COMPANY, OF BERLIN, NEW HAMPSHIRE, A CORPORATION OF MAINE.

RECORDER.

Application filed June 13, 1925. Serial No. 36,823. REISSUED

In many industries, such, for example, as the manufacture of paper, waste liquors should be as free as possible from valuable chemical constituents.

The present invention has for its object the recording of certain data to indicate whether or not such losses are being kept within reasonable limits. Furthermore, the record may at a point distant from the waste liquor outlet and preferably in the plant office where it will serve as a desirable check on the work of those whose duties are to keep these losses down.

By recording the specific gravity of the waste liquor the concentration of the chemical constituents therein is continuously ascertainable and if the rate of flow of waste is known the amount of the losses is seasily computable.

Primarily, therefore, this invention relates to a device for continuously recording, preferably at a distance, the specific gravity of the waste liquor and associating with this device means by which the volume of flow of this liquor to waste is ascertainable. Were it not for the flow indication it might be possible for excessive losses to be concealed by the dilution of waste liquor of excessively high specific gravity so that the specific gravity recorder would fail to disclose the true amount of losses.

For a more complete understanding of this invention, reference may be had to the accompanying drawings in which Figure 1 is a somewhat diagrammatic perspective showing an application of the subject matter of this invention.

Figure 2 is a side elevation of the specfic recorder, the electrical mechanism being shown somewhat diagrammatically.

Figure 3 is an enlarged detail in elevation.

Figure 4 is a detail section on line 4—4 of Figure 3.

Figure 5 is a section on line 5—5 of Figure 2.

Figure 6 is a vertical section through a modified construction of float.

Referring to Figure 1, 1 indicates a tank or reservoir having an inlet pipe 2 for waste liquor and a weir 3. The level of the pool of liquor above the lowest point of the weir thus becomes an indication of the rate of flow of the waste liquor which is thus a measure of the volume of the liquor, the specific gravity of which is to be measured.

This level of the pool of liquor in the tank 1 may be measured by taking readings of the weir level in the well known manner periodically, or if desired mechanism may be provided for continuously recording the weir reading.

Such continuously recording means is illustrated in Figure 1 and comprises a pressure chamber 4 inserted somewhat below the level of the liquor and a tube 5 extending therefrom through which the pressure due to hydrostatic head of the liquor above the lower edge of the chamber 4 is communicated to a transmitting indicator 6 which may be of a type to be more fully described and from which through wires 7 the indication may be transmitted to a recorder 8 which is preferably positioned in the plant office where it is inaccessible to the workmen having control of the rate of flow and presents a continuous visible indication to the plant manager of the rate of flow of the waste liquor The specific gravity recorder to which this invention is more particularly directed comprises a tank 10 in communication near its lower end through a pipe 11 with the tank 1 and having near its upper end an annular overflow chamber 12 communicating with the interior of the tank through a series of openings 13. A pipe 14 leading from this annular overflow chamber conducts the liquor passing through the tank either to waste or it is otherwise disposed of as may be found convenient. The pipe 11 being open permits a steady flow of liquor from the tank 1 through the tank 10 so that the liquor in the tank 10 is at all times substantially in the same condition as to its proportion of chemical content as the liquor being run over the weir 3. Within the tank 10 is a hydrometer float 15. As shown in Figures 2 and 5, this float comprises a short cylindrical chamber having dome shaped upper and lower ends 16 and 17. This chamber is weighted to a suitable extent with shot or other similar material as at 18 and is then hermetically sealed. To its upper end 16 is fixed a stem 20 which extends between a pair of guide rollers 21 carried by the lower face of a frame piece 22 arching over the upper end of the tank 10. To the upper face of this piece 22 is a U shaped strap 23 having a perforation 24 at its upper end in axial alinement with a similar perforation through the piece 22 and through which the stem 20 projects. Between the side walls of the member 23 the stem 20 is surrounded by a tension coil spring 25 which is fixed at its upper end to a collar 26 pinned or otherwise fastened to the stem 20. The lower end of this spring 25 is fixed to the piece 22. This spring acts to hold the float 16 submerged beneath the level of the liquor in the tank 10. At the upper end of the member 23 is a laterally extending frame piece 30, the outer end of which may be braced as by means of a bracket piece 31 fixed at its lower end to the outer wall of the overflow chamber 12. Upstanding from the piece 30 are supporting bars 32 to which may be fixed an electrical transmitting member 35. Also extending from the frame piece 30 and a short piece 36 parallel therewith are upstanding supports 37 between which is pivoted a sector 40 so positioned that the longitudinal axis of the stem 20 passes substantially tangent to its periphery. Above a pair of guide rollers 42 between which the upper end of the stem 20 passes, a flexible metallic ribbon or strap 45 is fixed at its lower end to the upper end of the stem 20 and at its other end to a suitable point on the periphery of the sector 40. This ribbon or strap 45 is held under tension by any suitable means such as a counterweight 48 connected to the sector 40. With this construction it will be seen that as the float 16 rises and falls, due to changes in the specific gravity of the liquor within which it is immersed, a vertical motion is imparted to the stem 20 and through the strap 45 an oscillatory motion is imparted to the sector 40.

The electrical transmitting device 45 may be of any suitable type, but as herein shown comprises a pair of coils 50 mounted at opposite ends of a rock lever 51 and arranged to move on or off of a pair of soft iron cores 52. This rock lever 51 has pivoted thereto a link 54 also pivoted to the sector 40. In order that the extent of rocking motion of the rock lever 51 relative to the rocking of the sector 40 may be adjusted, provision is made for adjusting the distance from the center of oscillation 56 of the sector of the attachment to the sector of the link 54. One means for effecting such an adjustment is shown best in Figures 3 and 4.

Referring to these figures it will be seen that the sector 40 has a radially arranged slot 60 therein within which is slidable a block 61 having a head 62 overlapping the face of the sector 40 on one side. This block 61 has a threaded shank portion 63 which extends through and is threaded into a nut 64. This nut 64 has integral therewith a sleeve 65 which surrounds the threaded shank 63 and bears at its inner end against a washer 66 engaging the outer end 67 of a cap member which surrounds the smaller end of the block 61 and bears against the opposite face of the sector 40 from the portion 62. By screwing the nut 64 in the proper direction the cap 67 may be pressed firmly against the face of the sector 40 and clamp the sector between it and the portion 62 in order to hold the block 61 in any position of adjustment lengthwise of the slot 60. The sleeve portion 65 is sufficiently long to pass through a carrier block 70 which is permitted to rock on this sleeve and which is perforated as at 71 for the passage of the end of the link 54 which may be fixed in any lengthwise adjusted position within this carrier block by means such as a set screw 72 to adjust the effective length of the link.

The coils 50 are connected as illustrated to the terminals of the secondary 80 of a transformer, the primary 81 of which is connected to the two sides of a suitable alternating current supply service line 82. Also in series with these coils 50 are coils 85 of a receiving recorder, these coils also being carried by a rock lever 86 and arranged to pass over to a more or less complete extent the soft iron cores 87. It will be noted that one of the coils 50 which is shown further removed from its core 52 is connected in series with that coil 85 which is further on its core and likewise that the coil 85 which is further on its core is in series with the coil 85 which is the further off its core. These coils are choke coils and impart impedance to the alternating current circuit to which they are connected and the tendency is for both the sets of coils which are in series to balance each other in their impedance so that the indicator and recorder arm 88 of the receiving mechanism takes a position corresponding at all times to the position of the arm 53. By this mechanism, therefore, the position of the coils 50, varying with changes in level of the float 15 due to changes in specific gravity of the liquor to be measured, is caused to effect a record at a distance on the recorder 90. The recorder 8 may be of the same type as the recorder 90 and receive its control from the sending indicator 6 in a similar manner. The indicator 6 may be of any type such as is well known in the art and no detail description of any particular mechanism is therefore believed to be necessary.

In some cases it may be desirable to compensate for changes in temperature of the liquor in obtaining the measurements of the specific gravity. This may be done by using a float for the specific gravity mechanism, such as is illustrated in Figure 6. In this figure the substantially cylindrical float 100 is provided with flexible expansible ends 101 which may be formed of plates having annular corrugations therein. This float is weighted as by means of shot 102 and above the shot a volatile liquid such as 103 may be placed therein, this liquid volatilizing more or less according to the temperature to which the float is subjected and acting in response to such volatilization to expand the float more or less, the upper and lower walls 100 yielding in response thereto. Thus the displacement of the float is increased on increase of temperature so that the actual weight of liquid displaced by it in the float tank is substantially the same throughout the temperature range for which the mechanism is designed to operate. Such a temperature responsive float may be used ordinarily through a comparatively limited range of temperature changes with a sufficient degree of accuracy.

Having thus described certain embodiments of this invention, it should be evident to those skilled in the art that various changes and modifications might be made therein without departing from its spirit or scope as defined by the appended claims.

We claim:

1. A device of the class described comprising a rockable sector, a hydrometer float, a flexible member engageable with the periphery of said sector and operatively connected to said float, an indicating device, and operative connections from said sector to said device including an element adjustable toward and from the center of rocking of said sector.

2. A device of the class described comprising a rockable sector, a hydrometer float, a flexible member engageable with the periphery of said sector and operatively connected to said float, an indicating device, and operative connections from said sector to said device including an element adjustable in its effective length and having its attachment to said sector adjustable toward and from the center of rocking thereof.

In testimony whereof we have affixed our signatures.

FOSTER A. BURNINGHAM.
HUGH K. MOORE.